United States Patent [19]

Stübbe

[11] 4,237,981

[45] Dec. 9, 1980

[54] HORSESHOE

[76] Inventor: Peter Stübbe, Schenkenberger Weg 17, 2061 Bliestorf, Fed. Rep. of Germany

[21] Appl. No.: 28,491

[22] Filed: Apr. 9, 1979

[30] Foreign Application Priority Data

Apr. 10, 1978 [DE] Fed. Rep. of Germany ....... 2815374

[51] Int. Cl.³ .......................... A01L 3/00; A01L 7/02
[52] U.S. Cl. ......................................... 168/4; 168/12; 168/14
[58] Field of Search .......................... 168/14, 12, 4, 26

[56] References Cited

U.S. PATENT DOCUMENTS

| 1,349,888 | 8/1920 | Kenny | 168/14 |
| 2,041,538 | 5/1936 | Gash et al. | 168/4 |
| 3,519,079 | 7/1970 | Bieber | 168/12 X |
| 3,630,289 | 12/1971 | Norberg | 168/12 X |

Primary Examiner—Hugh R. Chamblee
Attorney, Agent, or Firm—Michael J. Striker

[57] ABSTRACT

A horseshoe includes a horseshoe base which corresponds to the actual configuration of a horse's hoof. The base is mounted on the hoof so as to leave a space between a sole of the hoof and an upper surface of the base which faces the sole surface when the base is installed on the hoof. A filler material is filled in the space so as to support the hoof on the base when the latter is installed on the hoof.

13 Claims, 4 Drawing Figures

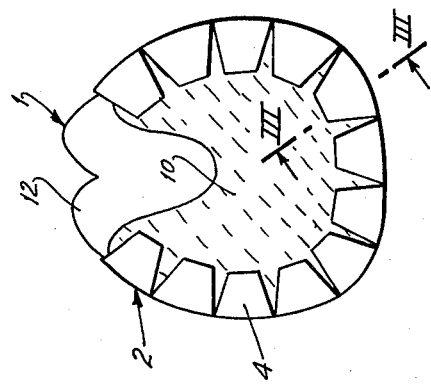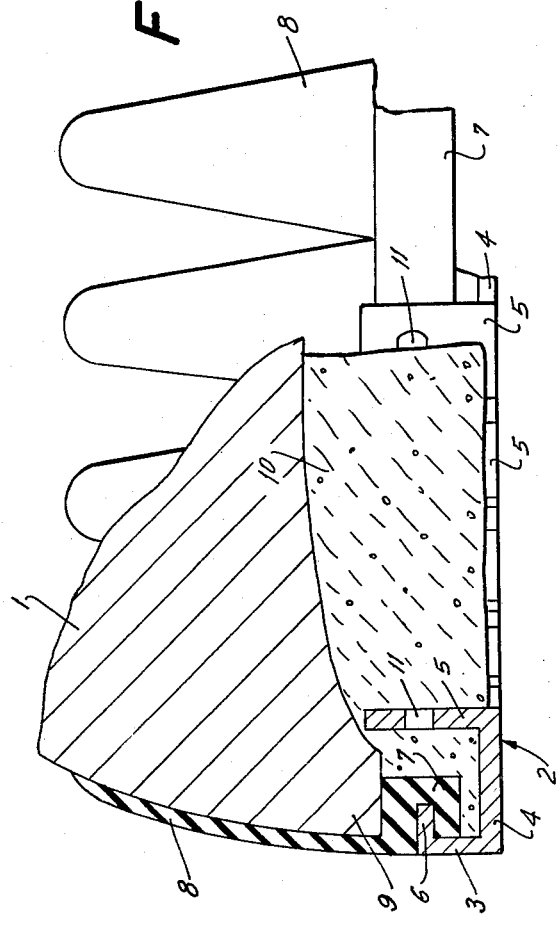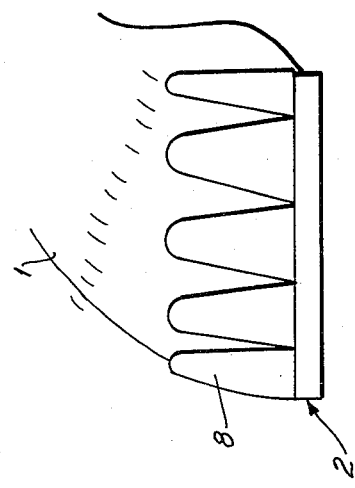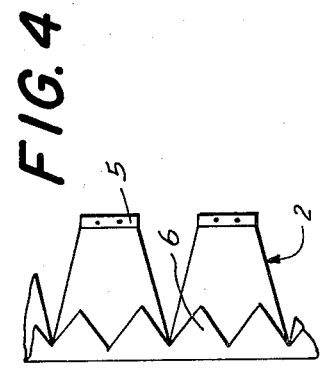

HORSESHOE

BACKGROUND OF THE INVENTION

The present invention relates to a horseshoe and a method of shoeing a horse with this horseshoe.

Horseshoes are well known in the art. In German Offenlegungsschrift No. 26 38 970 it has been suggested, for example, to provide a horseshoe having a shell of synthetic plastic material for embracing an outer surface of a horse's hoof and a horny crust of the sole of the hoof. The shell is glued to the outer surface of the hoof. The horseshoe further includes a metal plate, e.g. of aluminum, which has a configuration substantially corresponding to the sole surface. The plate may be detachably connected to the shell, for example by means of screws or the like.

The drawback of this horseshoe resides in insufficient rigidity in the connection between the metal plate and the synthetic plastic shell.

Moreover, the metal plates are produced in great numbers on corresponding machines. Obviously, such a plate only approximately corresponds to the actual configuration of the sole surface. As a result, such a horseshoe may very easily fall off from the horse's hoof.

Another disadvantage of the prior art horseshoe resides in the fact that the plate has a rather high bending resistance, which fact prevents any physiologically necessary movements of bones of the hoof, e.g. of the frog thereof, during movement of the horse or any growth of these bones which fact may result in deformation of the extremities of the horse.

SUMMARY OF THE INVENTION

It is a general object of the present invention to avoid the disadvantages of the prior art horseshoes and methods of shoeing a horse.

More particularly, it is an object of the present invention to provide such a horseshoe which prevents the movement of the bones of a horse's hoof considerably less as compared to that of prior art horseshoes.

Another object of the present invention is to provide an improved connection between synthetic plastic parts of the horseshoe and metal parts thereof.

Still another object of the present invention is to increase the service life of the horseshoe.

In pursuance of these objects and others which will become apparent hereafter, one feature of the present invention resides in providing a horseshoe which comprises a horseshoe base which corresponds to the actual configuration of the horse's hoof and means for so mounting said base on the horse's hoof as to leave a space between the sole of the hoof and an upper surface of the base which faces the sole surface when the base is installed on the hoof. A filler material is introduced in said space for filling the same so as to support the hoof on the base when the latter is in installed position on the hoof.

In accordance with another feature of the invention, the base is a plate having a U-shaped configuration and a significantly high elasticity so as to allow an adequate freedom of movement for the horse's hoof.

In yet another feature of the present invention, the filler is of synthetic plastic moldable material. When the filler is solidified, it ensures a reliably rigid durable and fatigue-resistant connection between the metal base and an elastic plate (i.e. mounting means), of synthetic plastic material, which is fixed on the hoof. Such a connection considerably increases the service life of the horseshoe.

In still another advantageous feature of the present invention, the base can be bent, even in the cold condition, on a corresponding form so as to correspond to the actual configuration of the hoof, that is to the sole thereof. This fact considerably reduces the chances that the horseshoe falls off from the hoof, since the horseshoe may be adjusted so as to adequately correspond to different hooves individually rather than in general as in the case of the prior art horseshoes.

In a further feature of the invention, the plate having a plurality of straps, also of synthetic plastic material, is connected to the base before the latter is installed on the hoof. In accordance with one embodiment of the present invention, the moldable filler material may be introduced in said space after the base is installed on the hoof. In this case the moldable filler material solidifies in the base which serves, at least partially, as a casting form. The upper surface of the moldable material conforms to the sole surface of the hoof. As a result, the relatively complicated casting process is significantly simplified.

In yet a further feature of the invention, the plate is provided with a circumferential recess for receiving corresponding projections of the base. The projections constitute relatively weak portions of the base and, therefore, can be very easily bent, e.g. in a cold condition thereof, so as to correspond to the circumferential recess on the plate. These weak projections have a relatively high degree of elasticity, which fact increases the freedom of movement of the horse's hoof on the one hand, and adjustability of the base to the actual configuration of the hoof on the other hand. Moreover, such an arrangement increases the reliability of the connection between the base and the plate.

Moreover, the elastic straps prevent any leakage of the moldable filler material from the space between the upper surface of the base and the sole surface of the hoof when this material is introduced into said space to solidify therein. In other words, the elastic straps constitute a padding (i.e. upholstery) between the upper portion of the plate and the hoof. During the casting process in accordance with the above-mentioned embodiment, the hoof is supported substantially on the plate so that no vertical load is exerted on the moldable material in said space. Obviously, such an arrangement significantly facilitates the solidifying process of the moldable material. The straps may be glued to the outer surface of the hoof very fast, which quickly renders it possible to substantially disregard the horse's patience factor during the shoeing process. In order to periodically inspect and attend the hoof of the horse, the straps may be very easily detached and, thereafter, reattached (i.e. glued back) to the hoof.

In still a further feature of the present invention, the upper surface of the filler material corresponds to the sole surface of the hoof. Thus, the circumferential crust projection of sole corresponds to a circumferential recess on the upper surface of the filler and the recess behind the crust projection of the sole corresponds to a respective projection on the upper surface of the filler. Obviously, such a relationship between the two surfaces, i.e. sole surface and the upper surface of the filler, ensure a reliable connection between the hoof and the horseshoe even under significantly high stresses (i.e. shock loads). Thus, the connection of the straps to the hoof is designed only to compensate for vertical loads on the horseshoe. Therefore, these straps may be relatively weak. Such a simple construction of the horseshoe which can be installed on the hoof in a simple and fast manner ensures that the horseshoe will not fall off from the hoof even when the horse runs fast.

In accordance with another feature of the present invention, a method of shoeing a horse comprises the steps of forming the horseshoe base corresponding to the actual configuration of the horse's hoof; connecting the base to the mounting means adapted for so mounting the base on the horse's hoof as to leave the space between the sole of the hoof and the upper surface of the base which faces the sole surface when the base is installed on the hoof; and introducing the filler material into said space to fill the same so as to support the hoof on the base when the latter is installed on the hoof.

As it has been mentioned previously, the moldable material can solidify directly in contact with the hoof, that is the base is installed on the hoof before the moldable material is introduced in said space. However, in order to obtain the adequate upper surface of the filler, the horse has to be made substantially steady (i.e. motionless) for quite a long time which depends on the actual type of the material used for the filler. Obviously, the task of making the horse steady is very complicated if possible at all. The horse, for example, may be put temporarily to sleep. Moreover, the heat development during the solidifying process of the moldable material may cause substantial damage to the hoof. On the other hand, the heat development makes the task of keeping the horse steady even less possible.

In accordance with another embodiment of the present invention the horseshoe with the filler may be prepared completely separately from the hoof. In this case the horseshoe is installed on the hoof as a completed unit including the base and the solidified filler material, which still corresponds to the actual configuration of the hoof.

In accordance with the other embodiment, a negative cast is taken from the hoof and the casting process is carried out in a workshop rather than directly on the hoof. A positive cast is then taken from the negative cast and the base is bent on the positive cast so as to correspond to the actual configuration of the hoof. Then, the positive cast with the base connected to the plate with the straps is inserted in a casting form and the moldable material is introduced into the casting form so as to solidify therein. Thus, the process of manufacturing the horseshoe and installing the same on the hoof may be accomplished in a very simple and trouble-free manner. In fact, an operator himself has to make a few very simple manipulations in a stable in order to shoe the horse, whereas all the relatively complicated steps of preparing the horseshoe are carried out in the workshop by horseshoe-making experts.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a side view of a horseshoe in accordance with the present invention;

FIG. 2 is a bottom view of the horseshoe shown in FIG. 1;

FIG. 3 is a sectional view taken along the line III—III in FIG. 2; and

FIG. 4 is a plan view of a part of a horseshoe base before the latter is in assembly with the remainder of the parts of the horseshoe shown in FIG. 3.

DESCRIPTION OF THE PREFERRED EMBODIMENTS

Referring now to the drawings and first to FIGS. 1 and 2 thereof, it may be seen that the reference numeral 1 designates a body of a horse's hoof provided with a metallic horseshoe base 2. FIGS. 3 and 4 show that the horseshoe base 2 is a three-times bent plate. The thickness of the plate is chosen so as to withstand the abrasion (i.e. wear), and may be, for example, of a few millimeters. The material of the plate is chosen so as to reduce corrosion, and may be, for example, of high-grade steel.

Thus, the base 2 includes a substantially vertical outer wall 3, a substantially horizontal wall 4 which connects the wall 3 with an inner wall 5. The outer wall 3 is provided with a projection 6 directed inwardly from the wall 3 and towards the inner wall 5. The projection 6 is received in a recess 7 of a plate 7 of synthetic plastic material, for example, rubber (see FIG. 3). The plate 7 is provided at the upper circumferential portion thereof with a plurality of straps 8 which can be connected (e.g. glued) to the outer surface of the hoof 1.

The horizontal wall 4 of the base 2 is cut in a number of V-shaped sections having crests spaced one from another, for example by two centimeters (FIGS. 3 and 4 have a scale of 1:1). The projection 6 of the base 2 is cut into a number, e.g. double to that of the sections of the wall 4, of V-shaped sections. The projection 6 extends substantially vertically to the wall 3. The outer wall 3 is not cut in sections at all. The base 2 may be bent in a workshop so as to correspond to the actual configuration of the horse's hoof 1. Moreover, the usual forging of the horseshoe is eliminated.

The hoof 1 has a horny crust portion 9 which projects circumferentially outwardly away from the rest portion of the sole of the hoof 1. The crust portion 9 is supported by an upper surface of the plate 7, when the horseshoe is installed on the hoof, and further through the projection 6 and the outer wall 3 the portion 9 is supported on the wall 4 of the base 2. When the plate 7 with the base 2 is installed on the hoof 1 there is left a space between the sole of the hoof 1 and the upper surface of the wall 4 of the base 2. This space is filled with a filler 10 of a hard form synthetic plastic material of a type having a relatively small residual elasticity, for example polyurethane foam. The inner walls 5 increase (i.e. reinforce) the connection, i.e. cohesion, between the filler 10 in the solidified condition and the base 2. Thus, the flowable material of the filler 10 solidifies between the adjacent walls 5, also the flowable material flows through the respective holes 11 in the walls 5 into a space behind the latter and solidifies there. In other words, the flowable material encompasses the walls 5 from all the sides thereof. Obviously, such a convenient distribution of the flowable material of the filler 10 increases considerably the rigidity of the filler 10 in the solidified condition thereof. Besides, the solidified filler 10 increases the reliability of the connection between the base 2 and the plate 7.

The upper surface of the filler 10 corresponds exactly to the sole surface of the hoof 1. Thus, the upper surface of the filler 10 has a recess so shaped as to correspond to and engage a portion of the horny crust 9 of the sole of the hoof 1 so as to develop a side connection between the hoof 1 and the filler 10. Thus, almost the entire hoof, with the exception of a frog 12 at the rear side of the hoof, engages the filler 10, in other words the base 2, so as to prevent any lateral displacement of the latter relative to the hoof 1. Therefore, it becomes unnecessary to connect (e.g. glue) the filler 10 to the sole surface of the hoof 1.

In order to prevent any displacement of the base under forces directed vertically relative to the sole surface, the straps 8 are glued to the outer surface of the hoof 1. FIG. 3 shows that the hoof 1 is connected to the horseshoe base 2 only through the plate 7, the straps 8 and the filler 10 to thereby protect the hoof against a potential damage. However, these elements do not prevent a physiologically necessary movement of the horse's hoof 1. This movement of the hoof 1 is also facilitated by the weak V-shaped sections of the base 2.

The method of shoeing the horse in accordance with the present invention may be carried out as follows:

At first, the hoof and the sole surface have to be very carefully cleaned. In case the hoof is damaged or is extremely flat, the latter has to be so cut as to obtain a projection on the sole surface, corresponding to the crust portion 9 shown in FIG. 3. This portion has to be extended along the entire circumference of the sole surface and towards the middle thereof. It is also important to provide a respective arch-like transition zone connecting the crust portion with the rest of the sole surface. Thereafter, an operator takes a negative cast of the hoof. A casting material used by dentists, for example, can be used for the negative cast. For this purpose the hoof is introduced into a tray with the casting material, located on the ground. The process of taking the negative cast is very easy and does not require any serious trouble either for the horse or for the operator. The negative cast is permitted to solidify and then is covered, if so desired or necessary, with an intermediate casting medium. A moldable material is then introduced into the negative cast to form a positive cast which is also permitted to solidify. Thus, the positive cast corresponds to the actual horse's hoof to be shoed.

The positive cast, which has the formation corresponding to the crust portion 9, is used to correspondingly bend the base 2 thereon. The bending process of the base 2 is accomplished in a simple and fast manner by the hands of the operator with a hammer, a clamp and a vise. When the base 2 is ready, the latter is connected to the plate 7 provided with the straps 8 (as shown in FIG. 3). During all these manipulations, the base 2 is still located on the positive cast in the manner similar to the arrangement shown in FIG. 3. Thereafter the arrangement including the plate 7, the straps 8, the base 2 and the positive cast is placed in a form which can be closed from all sides thereof. This form and additional locking means ensure that the above-mentioned parts and the positive cast will keep the mutual position relative to each other (i.e. corresponding to the arrangement shown in FIG. 3) during a casting process. This form also prevents any lateral outflow of a flowable material of the filler 10 from the form. Additionally, the form may be so shaped as to prevent any undesired casting of the flowable material during the casting process on certain parts of the horseshoe. For example, the form has to be so shaped as to prevent any casting of the flowable material on such parts of the metal wall 4 which are supposed to remain purely metal, i.e. without any layer of the synthetic plastic material whatsoever, for example at the region of the frog 12 of the hoof 1.

A synthetic plastic material of the filler 10 is introduced into the casting form. It is especially advantageous to use polyurethane foam for this purpose, which when solidified constitutes a hard form material with a relatively low residual elasticity. After the casting material is solidified the casting form is opened and the rear part of the formed article, that is the part corresponding to the frog 12 of the horse's hoof has to be separated. This is done in order to prevent any pressure on the frog when the horseshoe with the filler material 10 is installed on the hoof. The horseshoe is ready and can be installed on the hoof. Since the upper surface of the filler 10 corresponds exactly to the sole surface of the hoof, the process of installing such a horseshoe becomes very simple and yet very precise. In other words, the operator only has to install the horseshoe so that the horny crust portion 9 of the hoof is received in the corresponding recess of the filler 10. Once such a position has been obtained, the operator can be sure that there is no mistake in the position of the horseshoe on the hoof. Provision of the hoof with the crust portion 9 and the corresponding recess in the upper surface of the filler 10 makes it unnecessary to glue the upper surface of the filler to the sole surface of the hoof.

Thereafter, the straps 8 may be glued, by means of a convenient adhesive, to the outer surface of the hoof.

Thus, the horseshoe is fixed on the hoof via the straps which are of synthetic plastic material, preferably rubber. The connection between the sole and the filler ensures the adequate position of the horseshoe on the hoof. It has been recognized during experiments, that the horseshoe cannot fall off from the hoof even under extremely high stresses. The main stresses on the horseshoe are directed from below upwards and, therefore, press the horseshoe even more against the hoof. Potentially damaging shock loads act predominantly on the sole surface of the hoof and laterally as considered in the arrangement shown in FIG. 3. These stresses are compensated for elastically by the filler 10 without any shifting of the horseshoe relative to the hoof. The loads directed downwardly (for example, loads developed as a result of hooking some articles from the ground during upward movement of the hoof) are compensated for by the straps 8 glued to the hoof. However, due to the fact that the outside surface of the horseshoe is substantially smooth, that is there are no edges or projections (which theoretically may cause the undesired hooking of the articles and subsequently the vertical stresses) it is highly unlikely that such a hooking will take place.

The base 2 may be further provided, at the outer wall 3, with one or more metal plates (not shown) extending upwardly along the outer surface of the hoof. The metal plates may be fixedly connected to the base 2. Such plates improve holding effect of the base 2 on the hoof 1. However, should the plate 7 and the straps 8 be sufficiently rigid, these metal plates can be eliminated.

It will be understood that each of the elements described above, or two or more together, may also find a useful application in other types of horseshoes and a method of shoeing a horse differing from the types described above.

While the invention has been illustrated and described as embodied in a horseshoe and a method of shoeing a horse, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A horseshoe comprising
   (a) a horseshoe base formed of sheet metal and corresponding to the shape of the horse's hoof, having a U-shaped configuration;
   (b) fastening means constructed of a resilient material fixedly attached to said metal base and adapted for being secured to the outer wall of the hoof by glueing; and
   (c) a molded sole formed of a plastic material which fills the space provided in the U-shaped metal base and when the shoe is mounted on the hoof will substantially fill the space between the lower surface of the hoof and the metal base.

2. A horseshoe as claimed in claim 1 wherein said fastening means includes means for preventing any undesired displacement of the base relative to the hoof when said base is secured on the hoof.

3. A horseshoe as claimed in claim 1, additionally including means for attaching said molded sole to said base.

4. A horseshoe as claimed in claim 1 wherein said fastening means includes a plurality of straps fixedly connected to each other and each being adapted for being secured to the hoof.

5. A horseshoe as claimed in claim 4, wherein said fastening means includes a connecting plate, each of said straps being connected to said plate which is adapted to be bent around the hoof so as to position said straps around the hoof.

6. A horseshoe as claimed in claim 5, wherein said fastening means additionally includes a wall portion circumferentially embracing said base being rigidly connected thereto and extending substantially vertical relative to said base, said wall portion being fixedly connected to said connecting plate thereby affixing the same to said base.

7. A horseshoe as claimed in claim 6, wherein said wall portion is integrally connected to said base.

8. A horseshoe as claimed in claim 6, wherein said connecting plate is provided with a circumferential recess, said fastening means further includes at least one projection connected to said wall portion and extending radially inward therefrom, said projection being shaped so as to correspond to and engage with said recess to thereby connect said base to said plate.

9. A horseshoe as claimed in claim 8, wherein said projection has a V-shaped configuration.

10. A horseshoe as claimed in claim 8, wherein said fastening means includes a plurality of said projections all being received in said circumferential recess in said connecting plate.

11. A horseshoe as claimed in claim 1, wherein said metal base is formed in cross-section with a vertical outer wall, a vertical inner wall and a substantially horizontal wall which connects the inner and outer vertical walls.

12. A horseshoe as claimed in claim 11, wherein said inner wall is provided with openings for admitting the plastic material when said sole is being molded whereby there is provided a securing interlocking of said base with said molded sole.

13. A horseshoe as claimed in claim 11, wherein said fastening means are attached to the inner side of the outer wall of said metal base.

* * * * *